(12) United States Patent
Xu et al.

(10) Patent No.: US 10,746,291 B2
(45) Date of Patent: Aug. 18, 2020

(54) ENGINE TORQUE AND TORQUE CONVERTER BYPASS CLUTCH SLIP CONTROL DURING VEHICLE LAUNCH

(71) Applicant: Ford Global Technologies, LLC, Dearborn, MI (US)

(72) Inventors: Yang Xu, Dearborn, MI (US); Weitian Chen, Windsor (CA); Stuart N. Ford, Farmington Hills, MI (US); Zhengyu Dai, Canton, MI (US); Qi Wang, Novi, MI (US); Hong Jiang, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 24 days.

(21) Appl. No.: 16/250,650

(22) Filed: Jan. 17, 2019

(65) Prior Publication Data
US 2020/0232557 A1    Jul. 23, 2020

(51) Int. Cl.
*F16H 61/14* (2006.01)
*F02D 11/10* (2006.01)
*B60W 10/06* (2006.01)
*B60W 10/02* (2006.01)
*F16H 59/46* (2006.01)

(52) U.S. Cl.
CPC ......... *F16H 61/143* (2013.01); *B60W 10/02* (2013.01); *B60W 10/06* (2013.01); *F02D 11/105* (2013.01); *B60W 2510/0638* (2013.01); *B60W 2710/0644* (2013.01); *F16H 2059/467* (2013.01); *F16H 2061/145* (2013.01)

(58) Field of Classification Search
None
See application file for complete search history.

(56) References Cited

U.S. PATENT DOCUMENTS

| | | | | |
|---|---|---|---|---|
| 5,060,769 A | * | 10/1991 | Yoshimura | F16H 61/143 192/3.29 |
| 5,121,820 A | | 6/1992 | Brown et al. | |
| 5,743,364 A | * | 4/1998 | Oba | F16H 61/143 192/3.3 |
| 6,066,072 A | * | 5/2000 | Adachi | F16H 61/143 477/176 |
| 6,652,415 B2 | * | 11/2003 | Segawa | F16H 61/143 192/3.3 |
| 6,701,246 B2 | | 3/2004 | Riedle et al. | |
| 6,928,357 B2 | * | 8/2005 | Higashimata | F16H 61/143 477/34 |
| 6,942,597 B2 | * | 9/2005 | Segawa | F16H 61/143 477/169 |

(Continued)

*Primary Examiner* — Dirk Wright
(74) *Attorney, Agent, or Firm* — Vincent Mastrogiacomo; Brooks Kushman P.C.

(57) ABSTRACT

A method of operating a vehicle includes, responsive to a command to launch the vehicle and while the vehicle is in a first gear, determining, at a controller, a feedforward component including a target engine torque and a target bypass clutch torque, and a feedback component that is based on an error between the target converter slip and a measured converter slip and between the target wheel torque and a measured wheel torque. The method further includes changing a commanded engine torque and a commanded bypass clutch torque based on the feedforward component and the feedback component.

20 Claims, 3 Drawing Sheets

(56) References Cited

U.S. PATENT DOCUMENTS

| | | | |
|---|---|---|---|
| 7,085,640 B2* | 8/2006 | Segawa | F16H 61/143 192/3.3 |
| 7,100,720 B2* | 9/2006 | Ishikawa | B60K 6/485 180/65.26 |
| 7,346,442 B2* | 3/2008 | Higashimata | F16H 61/143 701/67 |
| 7,509,203 B2* | 3/2009 | Imamura | F16H 61/143 192/3.51 |
| 8,065,065 B2* | 11/2011 | Satou | F16H 61/143 701/51 |
| 8,100,802 B2 | 1/2012 | Lee et al. | |
| 8,886,435 B2* | 11/2014 | Nagami | F16H 61/143 180/292 |
| 9,879,769 B2* | 1/2018 | Zhang | F16H 45/02 |
| 10,131,342 B2* | 11/2018 | Meyer | B60L 50/16 |

* cited by examiner

ENGINE TORQUE AND TORQUE CONVERTER BYPASS CLUTCH SLIP CONTROL DURING VEHICLE LAUNCH

TECHNICAL FIELD

The present disclosure relates to vehicles and systems for controlling the powertrains of vehicles.

BACKGROUND

A vehicle powertrain may include one or both of an engine and an electric machine. The torque (or power) produced by the engine and/or the electric machine can be transferred through a transmission to the driven wheels to propel the vehicle.

SUMMARY

In at least one approach, a vehicle is provided. The vehicle may include an engine including a crankshaft. The vehicle may further include a transmission that may include a torque converter having an impeller, and a turbine fixed to a turbine shaft that is driveably connected to driven wheels of the vehicle. The torque converter may further include a bypass clutch configured to selectively lock the impeller and turbine relative to each other. The vehicle may further include a speed sensor disposed within the transmission and configured to output a speed signal indicating a measured impeller speed. The vehicle may further include a bypass clutch configured to output a slip signal indicating a slip at the bypass clutch. The vehicle may further include at least one controller configured to, in response to a command to launch the vehicle and while the vehicle is in a first gear, determine a feedforward component including a target converter slip and a target bypass clutch torque. The controller may further be configured to determine a feedback component that is based on an error between a target converter slip and a measured converter slip and between a target wheel torque and a measured wheel torque. The controller may further be configured to change a commanded engine torque and a commanded bypass clutch torque based on the feedforward component and the feedback component.

In at least one approach, a method of operating a vehicle may include, responsive to a command to launch the vehicle, determining, at a controller, a feedforward component including a target engine torque and a target bypass clutch torque, and a feedback component that is based on an error between a target converter slip and a measured converter slip and between a target wheel torque and a measured wheel torque. The method may further include, at the controller, changing a commanded engine torque and a commanded bypass clutch torque based on the feedforward component and the feedback component.

In at least one approach, a method includes, responsive to a command to launch a vehicle, changing, at a controller, a commanded engine torque and a commanded bypass clutch torque based on a feedforward component that includes a target engine torque and a target bypass clutch torque, and a feedback component that is based on an error between a target converter slip and a measured converter slip and between a target wheel torque and a measured wheel torque.

In at least one approach, a method of operating a vehicle is provided. The method may include, responsive to a command to launch the vehicle and while the vehicle is in a first gear, determining, at a controller, a feedforward component including a target engine torque and a target bypass clutch torque, and a feedback component that is based on an error between the target converter slip and a measured converter slip and between the target wheel torque and a measured/estimated wheel torque. The method may further include changing a commanded engine torque and a commanded bypass clutch torque based on the feedforward component and the feedback component.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
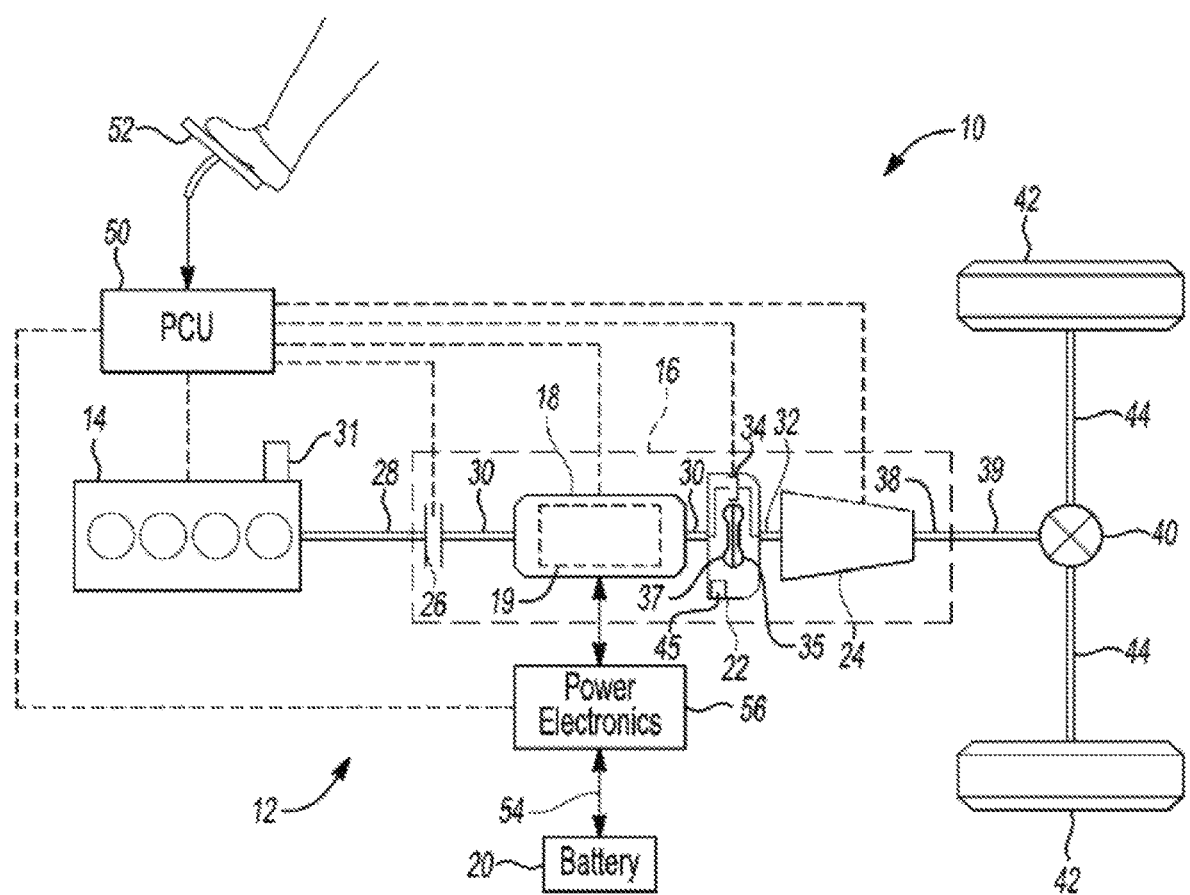
FIG. 1 is a schematic diagram of an example vehicle.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12 having an engine 14 that drives a transmission 16. In at least one approach, the transmission 16 may be a modular-hybrid transmission (WIT). As will be described in further detail below, a transmission 16 includes an electric machine such as an electric motor/generator (M/G) 18, an associated traction battery 20, a torque converter 22, and a multiple step-ratio automatic transmission, or gearbox 24. The M/G may also be referred to as the motor 18. In still another approach, the vehicle may include an engine 14 and not a M/G, or may include a M/G 18 and not an engine.

The engine 14 and the M/G 18 may both be drive sources for the HEV 10. The engine 14 generally represents a power source that may include an internal-combustion engine such as a gasoline, diesel, or natural gas powered engine, or a fuel cell. The engine 14 generates an engine power and corresponding engine torque that is supplied to the M/G 18 when a disconnect clutch (K0 clutch) 26 between the engine 14 and the M/G 18 is at least partially engaged. The M/G 18 may be implemented by any one of a plurality of types of electric machines. For example, M/G 18 may be a permanent-magnet-synchronous motor. Power electronics 56 condition direct current (DC) provided by the battery 20 to the requirements of the M/G 18, as will be described below. For example, power electronics may provide three-phase alternating current (AC) to the M/G 18.

When the disconnect clutch 26 is at least partially engaged, power flows from the engine 14 to the M/G 18. Power flow from the M/G 18 to the engine 14 is also possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. The shaft 30 extends through the M/G 18. The rotor 19 of the M/G 18 is fixed on the shaft 30, whereas the engine 14 is selectively driveably connected to the shaft 30 only when the disconnect clutch 26 is at least partially engaged.

A separate starter motor 31 can be selectively engaged with the engine 14 to rotate the engine to allow combustion to begin. The starter motor 31 may be powered by a 12-volt system of the vehicle. Once the engine is started, the starter motor 31 can be disengaged from the engine via, for example, a solenoid that engages/disengages a pinion gear with the ring gear on the flywheel (not shown). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is driveably connected to the torque converter 22 via the shaft 30. For example, the torque-converter housing may be fastened to the shaft 30. The torque converter 22 is therefore driveably connected to the engine 14 when the disconnect clutch 26 is at least partially engaged. Two components are driveably connected if they are connected by a power flow path that constrains their rotational speeds to be directly proportional. The torque converter 22 includes an impeller 35 fixed to the torque-converter housing (and consequently, fixed to the rotor 19) and a turbine 37 fixed to a transmission input shaft 32 that is driveably connected to the driven wheels 42. The torque converter 22 provides a hydraulic coupling between the shaft 30 and the transmission input shaft 32. The torque converter 22 transmits power from the impeller 35 to the turbine 37 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may be provided to, when engaged, frictionally or mechanically couple the impeller and the turbine of the torque converter 22, permitting more efficient power transfer. The torque converter bypass clutch 34 may be operated as a launch clutch to provide smooth vehicle launch. The bypass clutch 34 may be a wet-friction clutch controlled by fluid pressure supplied by the transmission pump or an auxiliary pump. The disks of the clutch frictionally engage to transfer torque through the bypass clutch when fluid pressure reaches a threshold value. In some applications, the disconnect clutch 26 is generally referred to as an upstream clutch and bypass clutch 34 is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 32. The gearbox 24 is automatically shifted from one ratio to another based on various vehicle and ambient operating conditions by an associated controller, such as a powertrain-control unit (PCU) 50. The gearbox 24 then provides powertrain output torque to output shaft 38. The output shaft 38 may be connected to a driveline 39 (e.g., a driveshaft and universal joints) that connects the output shaft 38 to the differential 40.

It should be understood that the hydraulically controlled gearbox 24 used with a torque converter 22 is but one example of a gearbox or transmission arrangement; any multiple-ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 38 may be connected to a driveline 39 that connects the output shaft 38 to the differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

While illustrated as one controller, the controller 50 may be part of a larger control system and may be controlled by various other controllers throughout the vehicle 10, such as a vehicle-system controller (VSC) and a high-voltage battery controller (BECM). It is to be understood that the powertrain-control unit 50 and one or more other controllers can collectively be referred to as a "controller" that controls various actuators in response to signals from various sensors to control functions such as starting/stopping engine 14, operating M/G 18 to provide wheel torque or charge the battery 20, select or schedule transmission shifts, etc. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 50 may communicate signals to and/or from the engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air-conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure (if applicable), crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust-gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. The pedal 52 may include a pedal-position sensor. In general, depressing and releasing the pedal 52 causes the pedal sensor to generate an accelerator-pedal-position signal that may be interpreted by the controller 50 as a demand for increased power or decreased power, respectively. Based at least upon input from the pedal, the controller 50 commands torque from the engine 14 and/or the M/G 18. The controller 50 also controls the timing of the gear shifts within the gearbox 24, as well as engagement or disengagement of the disconnect clutch 26 and the torque converter bypass clutch 34. Like the disconnect clutch 26, the bypass clutch 34 can be modulated across a range between the engaged and disengaged positions. This produces a variable slip in the torque converter 22 in addition to the variable slip produced by the hydrodynamic coupling between the impeller and the turbine. Alternatively, the bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as "hybrid mode," "engine-motor mode," or "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter and a DC/DC converter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive (e.g. drive) or negative (e.g. regenerative) torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely an example and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The vehicle-control system (which includes the controller 50) determines a driver-demanded torque based on signals from a pedal-position sensor associated with the accelerator pedal 52. This torque may be delivered by placing the powerplants (e.g., the engine and M/G) in torque control. In torque control, the controller determines a torque split between the engine and the motor and commands that torque from each of the powerplants.

The one or more of the powerplants (and especially the M/G) may also be controlled using speed control. In speed control, the controller sets a target motor speed and measures the speed of the motor. The controller compares these speeds and outputs a torque request to the motor based on an error between these speeds. The controller may use a model of the torque converter to determine a target speed for the motor.

The torque converter bypass clutch 34 physically locks the impeller to the turbine to increase efficiency of the torque converter by eliminating fluid losses associated with the fluid torque path of the torque converter. When the bypass clutch is locked, the actuators (e.g., the engine and M/G) and the driven wheels are fixed to each other. Disturbances from the actuators can propagate though the driveline to the driven wheels. These disturbances may cause instantaneous acceleration or deceleration of the vehicle, which the driver feels as jerks, hesitations, or other unexpected behavior. The fluid connection between the impeller and the turbine acts as a natural dampener to isolate the actuators from the driven wheels. When the bypass clutch is at least slipping, disturbances from the actuators are absorbed by the fluid torque path. To take advantage of the dampening effect of the torque converter, the bypass clutch can be at least partially opened during events having a high probability of producing driveline disturbances. For example, the bypass clutch may be closed during steady-state driving and open or slipping during dynamic vehicle events such as hard acceleration, gear shifts, and engine starting.

When the bypass clutch transitions from a locked state to a slipping state, the amount of torque transmitted to the driven wheels decreases, and the load on the impeller decreases causing the impeller speed to increase. This creates a torque hole, which if unmitigated, can create driveline disturbances noticeable by the driver. Similarly, when the bypass clutch transitions from a slipping state to a locked state, a torque surplus is created that can create driveline disturbances.

Figure 2:
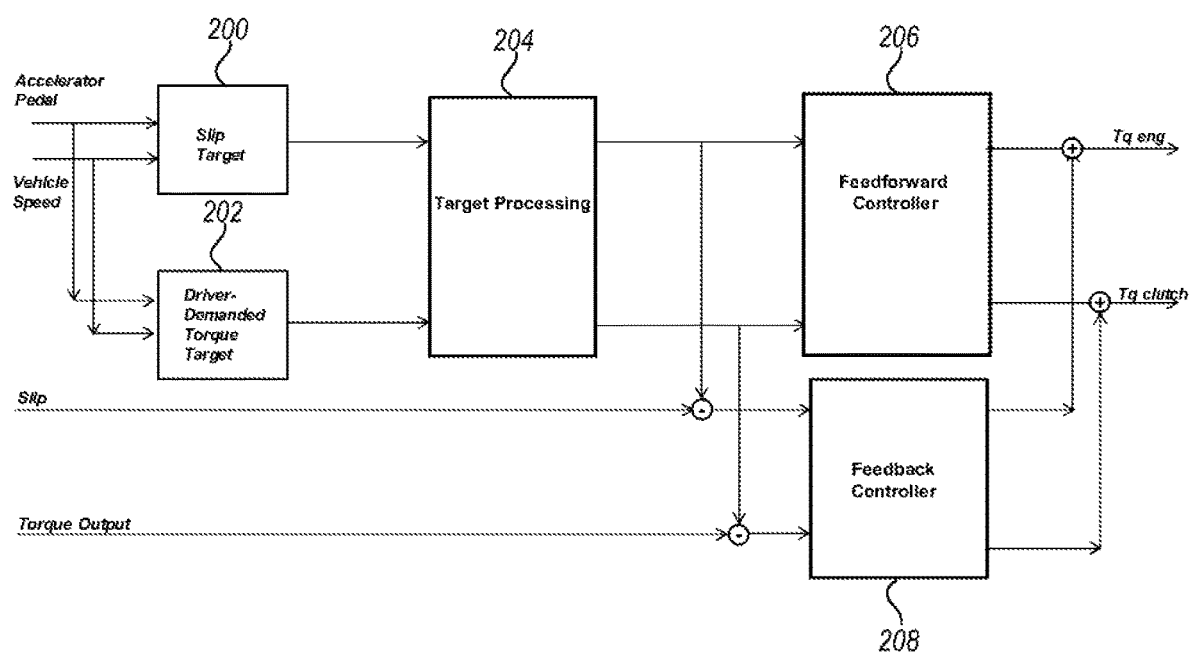
FIG. 2 is a control diagram illustrating an algorithm for controlling the vehicle.

FIG. 2 illustrates controls for operating controlling engine torque and converter slip. The controller receives an accelerator pedal-position signal and a vehicle speed signal. Based on those inputs, at box 200, the controller determines a raw driver-demanded torque. The raw driver-demanded torque may be determined, for example, using a lookup table that incorporates torque as a function of vehicle speed.

Also based on the accelerator pedal-position signal and vehicle speed signal inputs, at box 202, the controller determines a raw target torque converter slip. The raw target torque converter slip may be determined, for example, using a lookup table that incorporates torque converter slip RPM as a function of vehicle speed.

The raw driver-demanded torque and raw target torque converter slip may be processed at box 204. For example, a controller may determine at box 204 if the raw driver-demanded torque and the raw torque converter slip are achievable targets. If the raw driver-demanded torque is not an achievable target, the raw torque value is adjusted to an achievable target torque value at box 204. Similarly, if the raw torque converter slip is not an achievable target (for example, as a function of a capacity estimate of the disconnect clutch), the slip value is adjusted to an achievable target value at box 204.

The target torque value and target slip values are fed into a feedforward controller 206. Based on these inputs, the feedforward controller 206 outputs a feedforward engine torque and a feedforward bypass clutch torque.

The target driver-demanded torque and target slip values are also fed into box 208. Box 208 also receives the measured converter slip and an estimated of turbine torque. Based on these inputs, the feedback controller 208 outputs a feedback engine torque and a feedback bypass clutch torque. If estimate of turbine torque is not available, 0 can be applied The feedforward engine torque and the feedback engine torque are combined. A final engine torque-control command is sent to one or more powerplants, such as the engine 14 and/or motor 18. The final engine torque-control command may be, for example, based on a difference between a target impeller speed and the measured impeller speed. Also, a final bypass clutch torque-control command is sent to control the torque converter bypass clutch 34.

Figure 3:
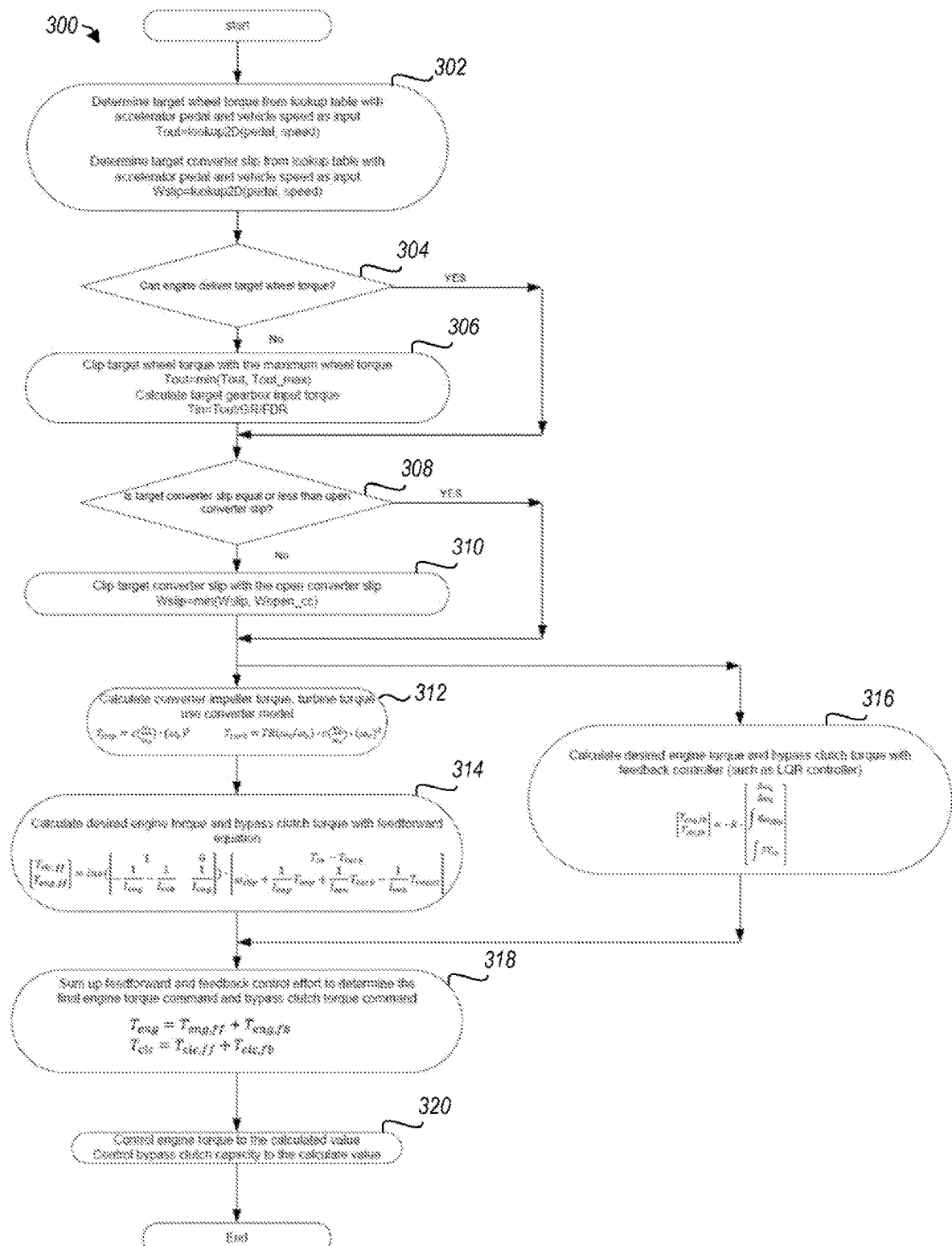
FIG. 3 shows a flow chart for operating the vehicle.

Referring now to FIG. 3, a method 300 for operating a vehicle in response to a vehicle launch command may be provided. A vehicle launch command may be provided, for example, at an accelerator pedal of the vehicle, and may include the release of the brake pedal.

The method 300 may include, in response to receiving the launch command, at step 302, determining a target wheel torque and a target converter slip. In at least one approach, the target wheel torque may be determined from a first lookup table. Parameters of the first lookup table may include, for example, accelerator pedal position and vehicle speed. In at least one approach, the target converter slip may be determined from a second lookup table. Parameters of the second lookup table may include, for example, accelerator pedal position and vehicle speed.

At step 304, the method may include determining whether the engine can deliver the target wheel torque. If the engine is unable to deliver the target wheel torque, the method continues to step 306, wherein the target wheel torque may be clipped to a maximum wheel torque. The method then proceeds to step 308.

If, at step 304, the engine is able to deliver the target wheel torque, the method continues to step 308.

At step 308, the method may include determining whether the target converter slip is less than or equal to an open converter slip. If the target converter slip is not less than or equal to the open converter slip, the method continues to step 310, wherein the target converter slip may be clipped to the open converter slip. The method then proceeds to steps 312 and 316.

If, at step 308, the target converter slip is less than or equal to an open converter slip, the method continues to steps 312 and 316.

Steps 312 and 314 may generally correspond to a feedforward routine. More particularly, at step 312, an impeller torque and turbine torque may be determined; for example, using converter models such as those provided in step 312 of FIG. 3. At step 314, a desired engine torque and bypass clutch torque may be calculated; for example, using equations such as those provided in step 314 of FIG. 3.

Steps 316 may generally correspond to a feedback routine. Step 316 may be performed concurrently, or substantially concurrently, with steps 312 and 314. At step 316, a desired engine torque and desired bypass clutch torque may be determined; for example, using an equation such as the one provided in step 316 of FIG. 3.

At step 318, the method may include summing the feedforward and feedback values. The sums of these values may assist in determining a final engine torque command and a final bypass clutch torque command.

At step 320, the method may include controlling the engine torque according to the final engine torque command determined at step 318. The method may further include controlling the bypass clutch capacity according to the final bypass clutch command determined at step 318.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an engine including a crankshaft;
   a transmission including a torque converter having an impeller, and a turbine fixed to a turbine shaft that is driveably connected to driven wheels of the vehicle, wherein the torque converter further includes a bypass clutch configured to selectively lock the impeller and turbine relative to each other;
   a speed sensor disposed within the transmission and configured to output a speed signal indicating a measured impeller speed;
   a bypass clutch configured to output a slip signal indicating a slip at the bypass clutch; and
   at least one controller configured to, in response to a command to launch the vehicle and while the vehicle is in a first gear,
   determine a feedforward component including a target converter slip and a target bypass clutch torque,
   determine a feedback component that is based on an error between a target converter slip and a measured converter slip and between a target wheel torque and a measured wheel torque, and
   change a commanded engine torque and a commanded bypass clutch torque based on the feedforward component and the feedback component.

2. The vehicle of claim 1 wherein the controller is further configured to modify the target wheel torque to a clipped target wheel torque responsive to the engine being unable to deliver the target wheel torque.

3. The vehicle of claim 1 wherein the controller is further configured to modify the target converter slip to a clipped converter slip responsive to the target converter slip exceeding an open converter slip.

4. The vehicle of claim 1 wherein the determination of the feedforward component and the feedback component are adjacent in time to each other.

5. The vehicle of claim 1 wherein the crankshaft of the engine is selectively coupled with the bypass clutch.

6. The vehicle of claim 1 wherein the command to launch the vehicle is received while a speed of the vehicle is zero.

7. The vehicle of claim 1 wherein the command to launch the vehicle is responsive to a change in pedal position of a brake pedal.

8. The vehicle of claim 1 wherein the command to launch the vehicle is responsive to a change in pedal position of an accelerator pedal.

9. The vehicle of claim 1 further comprising an electric machine including a rotor selectively coupled to the crankshaft.

10. The vehicle of claim 9 further comprising a disconnect clutch that selectively couples the crankshaft to the rotor of the electric machine.

11. The vehicle of claim 1 wherein the impeller is fixed to a crankshaft of the engine and the turbine is disposed on an input shaft of the transmission.

12. A method of operating a vehicle comprising:
    responsive to a command to launch the vehicle, at a controller:
    determining a feedforward component including a target engine torque and a target bypass clutch torque, and a feedback component that is based on an error between a target converter slip and a measured converter slip and between a target wheel torque and a measured wheel torque; and
    changing a commanded engine torque and a commanded bypass clutch torque based on the feedforward component and the feedback component.

13. The method of claim 12 further comprising:
    at the controller, modifying the target wheel torque to a clipped target wheel torque responsive to the engine being unable to deliver the target wheel torque.

14. The method of claim 12 further comprising:
    at the controller, modifying the target converter slip to a clipped converter slip responsive to the target converter slip exceeding an open converter slip.

15. The method of claim 12 wherein the determination of the feedforward component and the feedback component are adjacent in time to each other.

16. The method of claim 12 further comprising generating a command to start an engine.

17. The method of claim 12 wherein the command to launch the vehicle is received while the vehicle is in a first gear.

18. The method of claim 12 wherein the command to launch the vehicle is received while a speed of the vehicle is zero.

19. The method of claim 12 wherein the command to launch the vehicle is responsive to a change in pedal position of a brake pedal.

20. A method comprising:
    responsive to a command to launch a vehicle, at a controller:
        changing a commanded engine torque and a commanded bypass clutch torque based on
        a feedforward component that includes a target engine torque and a target bypass clutch torque, and
        a feedback component that is based on an error between a target converter slip and a measured converter slip and between a target wheel torque and a measured wheel torque.

\* \* \* \* \*